April 7, 1953
D. H. McCORKLE, JR
2,634,059
MANUAL CONTROL MEANS FOR THERMOSTATICALLY
CONTROLLED FLOAT VALVES
Filed March 13, 1950
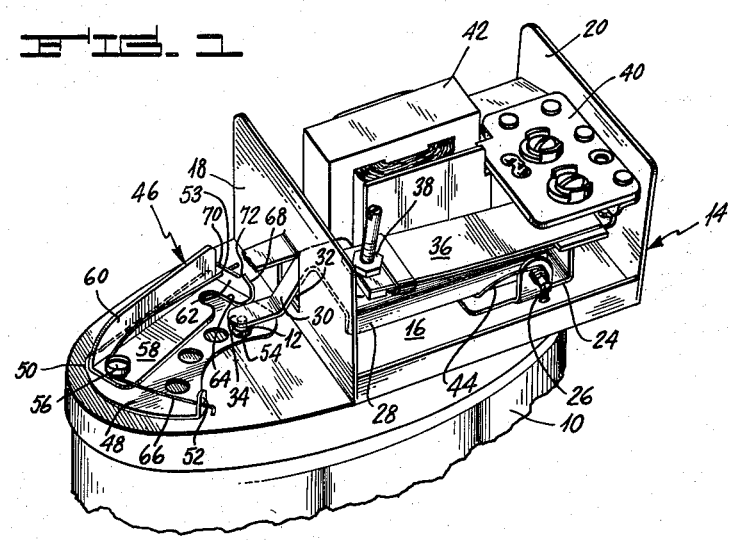
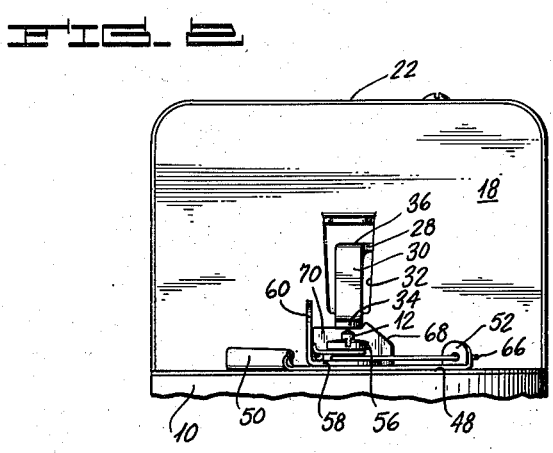
Inventor
DONALD H. McCORKLE JR.
By Naylor and Lasagne
Attorneys Patented Apr. 7, 1953

2,634,059

UNITED STATES PATENT OFFICE 2,634,059

MANUAL CONTROL MEANS FOR THERMOSTATICALLY CONTROLLED FLOAT VALVES

Donald H. McCorkle, Jr., Berkeley, Calif., assignor to D. H. McCorkle Co., Berkeley, Calif., a corporation of California Application March 13, 1950, Serial No. 149,289

4 Claims. (Cl. 236—101)

1

This invention relates to float valve control means, and more particularly to the provision in a float valve system, adapted for the metering of oil to a furnace, or the like, having an automatic control head of the thermostat type, of an auxiliary or manual control means operable to set the float valve at high-fire condition when the automatic or thermostat control, which is operable in one operative position to maintain the float valve at a low-fire setting, becomes temporarily inoperative, as when there is a current failure in the thermostat circuit.

In summary, the manual control means of the invention is adapted for incorporation in the general environment of a float valve and an automatic control head therefor comprising a lever-type bimetal control element having its end in such relation to the float valve button that when the bimetal element is in the lower position, as when the thermostat-controlled circuit is open, the float valve button will be held down, thereby reducing fluid flow through the float valve to the low-fire rate, and when the bimetal element is in the upper position, as when the thermostat-controlled circuit is closed, the float valve button, which is normally spring-urged upwardly, will be allowed to rise, thereby increasing fluid flow through the valve to a high-fire rate, determined by the pre-setting of the float valve knob. In this conventional environment, the manual control means of the invention, having the function of enabling operation of the float valve independently of the thermostat control system, comprises a lever pivotally mounted on the valve housing and embodying: means which upon pivotal movement of the lever in one direction is operable to cam the bimetal element, or a lever-type member serving as a suitable extension thereof, upwardly out of engagement with the float valve button; means to secure said lever in latched or frictionally engaged relation beneath said bimetal element, or member serving as an extension thereof; and means operable thereafter upon the movement upwardly of the bimetal element to restore said lever to an inoperative position.

Further details of the invention will be apparent from the following description matter taken in conjunction with the drawing forming part of this specification, and in which:

Figure 1 is a perspective view of the upper portion of a float valve housing, showing the automatic control head with its cover removed, and showing the manual control means of the invention in its normal or non-operated position, i. e., with the flow valve button at low-fire position under the control of the automatic head; and

2

Figure 2 is a view in end elevation of the arrangement of Figure 1.

Referring to the drawing for more specific details of the invention, 10 indicates the housing of a float valve having a float valve control button 12 which is spring-urged upwardly. The valve is conventionally provided with a primary control knob, not shown, which, when the button 12 is in its raised position, limits the high-fire rate of flow of fluid through the float valve to a value determined by the setting of said knob. When the button 12 is depressed, the flow of fluid through the valve is limited to a low-fire value.

In order to automatically control the high-fire-low-fire operation of the valve, automatic control heads of the type indicated generally at 14 have been provided. The control head 14, illustrated in the drawing, comprises a supporting shell having a bottom wall 16 secured to the upper surface of the housing 10, and end walls 18 and 20. The complementary cover 22 for the shell has been omitted from Figure 1, but is shown in place in Figure 2. Secured to the bottom wall 16 of the shell is a bracket 24 serving as a support for a fixed shaft 26 upon which the lever member 28 is pivotally mounted, said lever member being provided with a forward portion 30 extending through the aperture 32 in shell wall 18 and having a foot portion 34 in overlying relation to the valve button 12. A bimetal element 36 carrying tension adjusting means 38 has its rearward end secured to the bracket 24. A thermostat circuit lead plate 40 and a transformer 42 are also carried within the shell.

With this described conventional arrangement the valve is controlled for high and low fire operation. When the thermostat circuit is open, the bimetal element 36 is in the lower position of Figure 1, holding lever member 28 down so that the foot portion 34 thereof maintains valve button 12 in its depressed position, thereby placing the valve in low-fire operation. When the thermostat circuit is closed, the bimetal element moves upwardly, responsive to a rise in temperature caused by its heating element, to allow the lever member 28 to be moved upwardly by valve button 12. Spring 44 carried by shaft 26 counterbalances the weight of lever member 28 so that the button 12 does not carry the weight of this member.

From the above description it will be clear that in the event of a failure in the electrical circuit controlling the operation in the bimetal element 36, the bimetal element will not move upwardly when the room temperature drops below the thermostat setting, with the result that the burner will be maintained at a low-fire stage. In order to provide against such a contingency and enable operation of the burner independently of the thermostat control, the auxiliary or manual control means indicated generally at 46 are provided, with said control means comprising a mounting plate 48 provided with an upturned flange 50 at one side thereof, an apertured ear 52, and an aperture 54. The plate 48 is secured to the housing 10 by a screw 56 and by sleeving the valve button 12 through the aperture 54. Screw 56 also serves as the pivotal support for a control arm 58 having a side flange 60, an end flange 62, and a slot 64. Spring 66, having its ends anchored in the aperture of ear 52 and the aperture 53 of end flange 62, is coiled around screw 56 and serves to yieldingly urge control arm 58 into abutting relation with the side flange 60 of plate 48. The end flange 62 is characterized by an angularly inclined camming surface 68 forming the forward part of its upper edge, a straight edge portion 70 located at a level below the highest portion of camming surface 68, and a short downwardly and rearwardly inclined portion 72 joining the portion 70 with camming surface 68. The forward end of flange 62 is of a height slightly less than the distance between plate 48 and the foot portion 34 of lever member 28 when the latter is in the low position of Figure 1.

Assuming that the bimetal element is retaining the valve button 12 in the low-fire position, and that it is desired to bring the button to high-fire position, but the automatic or thermostat control system is temporarily inoperative for this purpose, the control arm is pivoted to bring the camming surface 68 into engagement with the underside of foot portion 34 of lever member 28, whereupon further movement of the arm is effective to cam lever member 28 upwardly against the downwardly acting force of bimetal element 36 to bring the foot portion 34 out of engagement with button 12. When the camming surface 68 has been moved past the foot of the lever, the lever is snapped into engagement with surface 70 by the bimetal element 36 to hold the control arm in this latching position against the force applied to the control arm by its return spring 66. When the control arm is in this latched position, the valve button 12 extends through slot 64 of the arm. The float valve is then in the high-fire condition of operation. The latching connection between the control arm and the lever is more in the nature of a safeguard than a necessity, since the downward face of the lever on surface 70 of the control arm is sufficient to maintain the control arm in position. The slight notch defined by surfaces 70 and 72 serves to ensure the retention of the control arm in position by the lever even in the event the valve is severely vibrated.

When the thermostat circuit is again in operating condition, and the temperature of the room is still such as to call for high-fire operation of the furnace, the bimetal element 36 will be moved upwardly, allowing spring 66 to return control arm 58 to its normal position against plate flange 50, the force of spring 66 as applied to the foot portion 34 of lever member 28 through the angular surface 72 of the end flange of the control arm being sufficient to move said foot portion upwardly to free the control arm for return movement even in the absence of spring 44. When the control arm has returned to its initial position the float valve is again operationally controlled by the automatic thermostat control system.

It will be understood that the bimetal element could be provided with an integral extension so arranged as to serve the function of lever member 28. The lever member is conventionally provided in the automatic control system for purposes of economy and ease of assembly of the system.

It will be obvious to those skilled in the art to which this invention pertains that the auxiliary or manual control system of the invention may be applied to a solenoid-actuated fluid valve, the stem of which may be raisable by the solenoid to a high-fire position in response to operation of a thermostat control system for the solenoid. In such event the control arm of the present auxiliary system could be utilized to cam the valve stem upwardly, with the weight of the stem being made effective to latch the manual control arm in supporting relation to said stem, until subsequent operation of the solenoid releases the control arm by moving the stem upwardly.

While a preferred embodiment of the invention has been shown and described, it is to be understood that all substantial equivalents of said embodiment are within the scope of the invention.

What I claim as new and desire to secure by Letters Patent is:

1. In a float valve and control system therefor having a vertically movable valve stem protruding through the valve casing and being yieldingly depressable to convert the valve from high-feed to low-feed operation, thermostat control means, and lever means responsive to said control means downwardly movable to depress said stem and upwardly movable to allow said stem to rise; the provision of auxiliary control means adapted to enable the operation of said valve independently of the thermostat control means when said lever means is in the lower position comprising an arm mounted on said casing for horizontal swinging movement toward and away from said lever means, said arm embodying means engageable with the underside of said lever means for the forced camming of said lever means upwardly out of engagement with said stem, means for holding said arm beneath said lever means to maintain said lever means out of engagement with said stem, and spring means for returning said arm to its initial position when said lever means is moved upwardly responsive to said thermostat control means.

2. In a float valve and control system therefor having a vertically movable valve stem protruding through the valve casing and being yieldingly depressable to convert the valve from high-feed to low-feed operation, thermostat control means, and lever means responsive to said control means downwardly movable to depress said stem and upwardly movable to allow said stem to rise; the provision of auxiliary control means adapted to enable the operation of said valve independently of the thermostat control means when said lever means is in the lower position comprising an arm pivotally mounted on the valve casing and yieldingly swingable horizontally to bring its leading end beneath said lever means, said arm being provided at its leading end with a camming surface operable to force said lever means upwardly away from said valve stem and an indented upper surface portion with which said lever means is engageable to frictionally maintain said arm beneath said lever means, said arm being returnable to its initial position when said lever means is relatively freely movable upwardly responsive to said thermostat control means.

3. In a float valve and control system therefor having a vertically movable valve stem protruding through the valve casing and being yieldingly depressable to convert the valve from high-feed to low-feed operation, thermostat control means, and lever means responsive to said control means downwardly movable to depress said stem and upwardly movable to allow said stem to rise; the provision of auxiliary control means adapted to enable the operation of said valve independently of the thermostat control means when said lever means is in the lower position comprising an arm pivotally mounted on the valve casing for horizontal swinging movement to bring its leading end transversely beneath and past said lever means, spring means for said arm adapted to yieldingly oppose movement of said arm toward said lever means, said arm being provided at its leading end with a downwardly and forwardly inclined first camming surface operable to force said lever means upwardly away from said valve stem and a downwardly and rearwardly inclined second camming surface adjacent said first surface, said arm being retained beneath said lever means by the downwardly applied force of said lever means, said spring means for said arm and said second camming surface being conjointly operable to move said arm out of the path of movement of said lever means when said lever means is thereafter relatively freely movable upwardly responsive to said thermostat control means.

4. In a float valve and control system therefor having a valve stem protruding through the valve casing and being yieldingly depressable to convert the valve from high-feed to low-feed operation, thermostat control means, and lever means responsive to said control means downwardly movable to depress said stem and upwardly movable to allow said stem to rise; the provision of auxiliary control means adapted to enable the operation of said valve independently of the thermostat control means when said lever means is in its lowermost position comprising an arm mounted on the valve casing for yielding movement transversely of and beneath said lever means, a camming surface on the leading portion of said arm for the forced camming of said lever means upwardly to allow said valve stem to rise, and an indentation formed in the upper surface of said arm disposed rearwardly of said camming surface adapted to receive said lever means whereby said lever means, while disposed above its lowermost position, retains said arm therebeneath.

DONALD H. McCORKLE, Jr.

REFERENCES CITED

The following references are of record in the file of this patent:

UNITED STATES PATENTS

| Number | Name | Date |
|---|---|---|
| 1,844,071 | Newell | Feb. 9, 1932 |
| 2,038,748 | Mantz | Apr. 28, 1936 |
| 2,155,358 | Cyr | Apr. 18, 1939 |
| 2,187,045 | McCorkle | Jan. 16, 1940 |
| 2,317,063 | Johnson | Apr. 20, 1943 |
| 2,358,999 | Ray | Sept. 26, 1944 |
| 2,361,913 | Breese | Nov. 7, 1944 |
| 2,465,119 | Resek et al. | Mar. 22, 1949 |
| 2,470,572 | Miller et al. | May 17, 1949 |